(12) United States Patent
Sarwar et al.

(10) Patent No.: US 8,559,302 B2
(45) Date of Patent: Oct. 15, 2013

(54) SYSTEMS AND METHODS FOR DISTRIBUTED SERVICE PROTECTION ACROSS PLUG-IN UNITS

(75) Inventors: Muhammad Sakhi Sarwar, Brookfield, CT (US); Zigmunds Andis Putnins, Ridgewood, NJ (US); Jaya Sarup, Monroe, NY (US); Zanjun Lu, Edison, NJ (US)

(73) Assignee: Fujitsu Limited, Kawasaki-shi (JP)

( * ) Notice: Subject to any disclaimer, the term of this patent is extended or adjusted under 35 U.S.C. 154(b) by 288 days.

(21) Appl. No.: 13/171,770

(22) Filed: Jun. 29, 2011

(65) Prior Publication Data
US 2013/0003535 A1  Jan. 3, 2013

(51) Int. Cl.
*H04L 12/28* (2006.01)
(52) U.S. Cl.
USPC .............. 370/228; 370/351; 370/230.1
(58) Field of Classification Search
USPC ................. 370/216–228, 401–409
See application file for complete search history.

(56) References Cited

U.S. PATENT DOCUMENTS

| 7,180,867 B2 * | 2/2007 | Hoch et al. ............. 370/244 |
| 2003/0117952 A1 * | 6/2003 | Ueno et al. ............. 370/228 |
| 2006/0233182 A1 * | 10/2006 | Appanna et al. ......... 370/401 |
| 2008/0159124 A1 * | 7/2008 | Sasaki .................... 370/217 |
| 2010/0177775 A1 * | 7/2010 | Gonda .................... 370/392 |
| 2012/0051266 A1 * | 3/2012 | Lindstrom et al. ....... 370/256 |
| 2012/0182866 A1 * | 7/2012 | Vinayagam et al. ..... 370/228 |

* cited by examiner

*Primary Examiner* — Chi Pham
*Assistant Examiner* — Fahmida Chowdhury
(74) *Attorney, Agent, or Firm* — Baker Botts L.L.P.

(57) ABSTRACT

A method may include provisioning: a first flow from a client-side port to a network-side port of the plug-in unit; a second flow from the network-side port to the client-side port; a third flow from the network-side port to a mate link configured to interface with a fourth flow from the mate link to a second client-side port of the second plug-in unit; a fifth flow from the mate link to the network-side port configured to interface with a sixth flow from the second client-side port to the mate link; a seventh flow from the client-side port to the mate link configured to interface with an eighth flow from the mate link to a second network-side port of the second plug-in unit; and a ninth flow from the mate link to the client-side port configured to interface with a tenth flow from the second network-side port to the mate link.

20 Claims, 4 Drawing Sheets

SYSTEMS AND METHODS FOR DISTRIBUTED SERVICE PROTECTION ACROSS PLUG-IN UNITS

TECHNICAL FIELD OF THE DISCLOSURE

The present disclosure relates generally to networked communications and, more particularly, to systems and method for implementing distributed service protection across plug-in units in a network element.

BACKGROUND

A communication network may include network elements that route packets through the network. Some network elements may include a distributed architecture, wherein packet processing may be distributed among several subsystems of the network element (e.g., line cards, switches, and traffic managers). In some instances, a network element used in a communication network may be a multi-function Ethernet aggregation network element. A multi-function Ethernet aggregation network element may be one which supports many functions, including without limitation link aggregation, virtual LAN (VLAN) detection, and traffic management/shaping.

In many instances, communication networks may employ link aggregation. Link aggregation (e.g., IEEE 802.1AX-2008) may generally describe the practice of using multiple network cables or ports in parallel to increase the link speed beyond the limits of any one single cable or port. Link aggregation may also be used to provide fault protection by increasing redundancy for higher availability. In link aggregation, a group or set of ports may be combined and represented as a single logical port to other components of the network system. Various switching elements of the network system may "see" the aggregated ports (known as a "link aggregation group" or "LAG") as a single logical communication port in the routing tables or databases of network elements external to the LAG.

In addition, to ensure high reliability and availability in communications networks, protection switching is often used. When implemented, protection switching typically provides a primary or "working" path for a network and a redundant or "protection" path for the network. Accordingly, each path of a protection group may be monitored, and if a failure is detected on the working path, network traffic may be switched to the protection path. A LAG, because it includes a group of ports, may be used to perform protection switching. Other protection switching methodologies or protocols may also be employed in communication networks.

A multi-function Ethernet aggregation network element may include a distributed architecture including one or more plug-in units (PIUs). A PIU may comprise a modular electronic device that provides any suitable network communication functionality. For example, a PIU may include, among other things, an switch (e.g., an Ethernet switch) for switching traffic through the network element and a traffic manager for shaping and/or policing network flows.

In certain instances, PIUs may employ chip stacking, a hardware feature by which adjacent PIUs may interoperate by interconnecting chips of same type seamlessly using proprietary structure and protocols. Some PIUs may also support link aggregation and other protection switching schemes in hardware. However, a PIU supporting many hardware-based functions may be costly and have a relatively large physical footprint. Cost and size may be minimized by using PIUs not having such hardware-based features. However, without such hardware-based components, PIUs may not support stacking, protection switching, or other desirable features.

SUMMARY

According to one embodiment, a method may include: (i) provisioning a first flow from a client-side port of a plug-in unit to a network-side port of the plug-in unit; (ii) provisioning a second flow from the network-side port to the client-side port of the plug-in unit; (iii) provisioning a third flow from the network-side port to a mate link configured to communicatively couple the plug-in unit to a second plug-in unit, the third flow configured to interface with a fourth flow from the mate link to a second client-side port of the second plug-in unit; (iv) provisioning a fifth flow from the mate link to the network-side port, the fifth flow configured to interface with a sixth flow from the second client-side port to the mate link; (v) provisioning a seventh flow from the client-side port to the mate link, the seventh flow configured to interface with an eighth flow from the mate link to a second network-side port of the second plug-in unit; and (vi) provisioning a ninth flow from the mate link to the client-side port, the ninth flow configured to interface with a tenth flow from the second network-side port to the mate link.

Certain embodiments of the invention may provide one or more technical advantages. For example, methods and systems disclosed herein may provide for software-based datagram forwarding, switching, policing, and shaping using plug-in units without hardware support for chip stacking or chip awareness.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present disclosure and its features and advantages, reference is now made to the following description, taken in conjunction with the accompanying drawings, in which.

DETAILED DESCRIPTION

Figure 1:
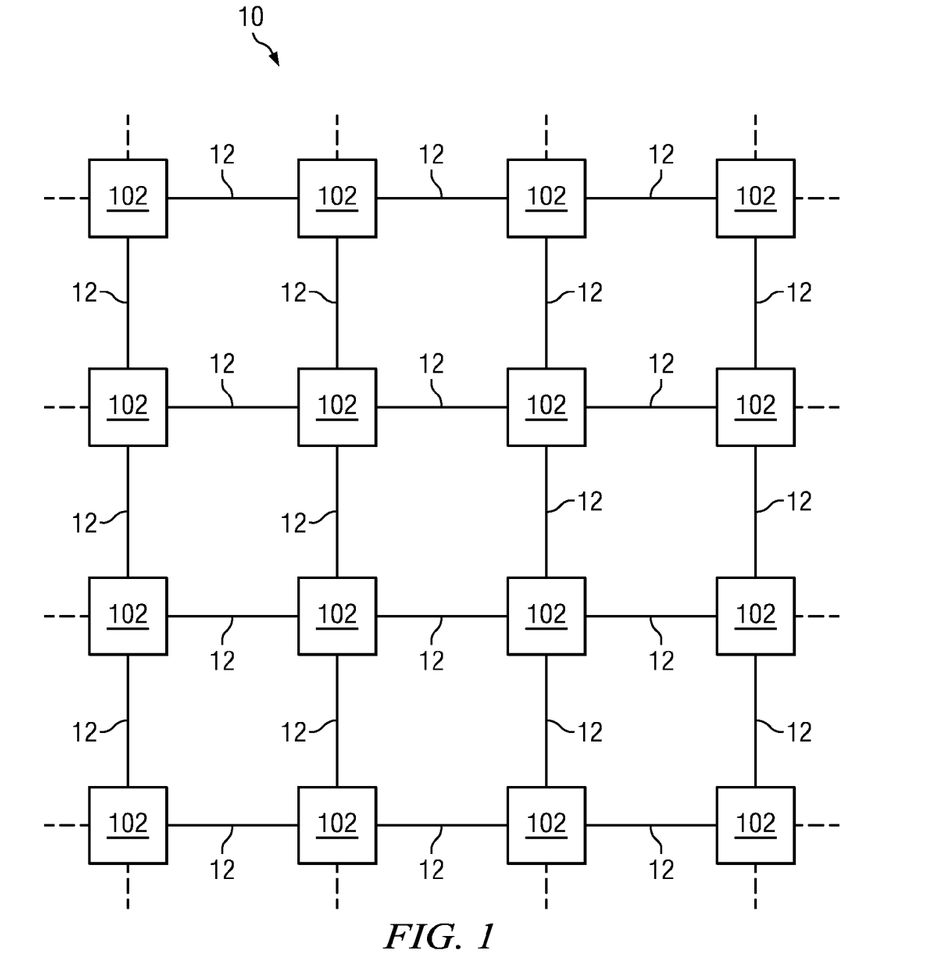
FIG. 1 illustrates a block diagram of an example communication network, in accordance with certain embodiments of the present disclosure.

FIG. 1 illustrates a block diagram of an example network 10, in accordance with certain embodiments of the present disclosure. In certain embodiments, network 10 may be an Ethernet network. Network 10 may include one or more transmission media 12 operable to transport one or more signals communicated by components of network 10. The components of network 10, coupled together by transmission media 12, may include a plurality of network elements 102. In the illustrated network 10, each network element 102 is coupled to four other nodes. However, any suitable configuration of any suitable number of network elements 102 may create network 10. Although network 10 is shown as a mesh network, network 10 may also be configured as a ring network, a point-to-point network, or any other suitable network or combination of networks. Network 10 may be used in a short-haul metropolitan network, a long-haul inter-city network, or any other suitable network or combination of networks.

Each transmission medium 12 may include any system, device, or apparatus configured to communicatively couple network devices 102 to each other and communicate information between corresponding network devices 102. For example, a transmission medium 12 may include an optical fiber, an Ethernet cable, a T1 cable, a WiFi signal, a Bluetooth signal, or other suitable medium.

Network 10 may communicate information or "traffic" over transmission media 12. As used herein, "traffic" means information transmitted, stored, or sorted in network 10. Such traffic may comprise optical or electrical signals configured to encode audio, video, textual, and/or any other suitable data. The data may also be real-time or non-real-time. Traffic may be communicated via any suitable communications protocol, including, without limitation, the Open Systems Interconnection (OSI) standard and Internet Protocol (IP). Additionally, the traffic communicated in network 10 may be structured in any appropriate manner including, but not limited to, being structured in frames, packets, or an unstructured bit stream.

Each network element 102 in network 10 may comprise any suitable system operable to transmit and receive traffic. In the illustrated embodiment, each network element 102 may be operable to transmit traffic directly to one or more other network elements 102 and receive traffic directly from the one or more other network elements 102. Network elements 102 will be discussed in more detail below with respect to FIGS. 2 and 3.

Modifications, additions, or omissions may be made to network 10 without departing from the scope of the disclosure. The components and elements of network 10 described may be integrated or separated according to particular needs. Moreover, the operations of network 10 may be performed by more, fewer, or other components.

Figure 2:
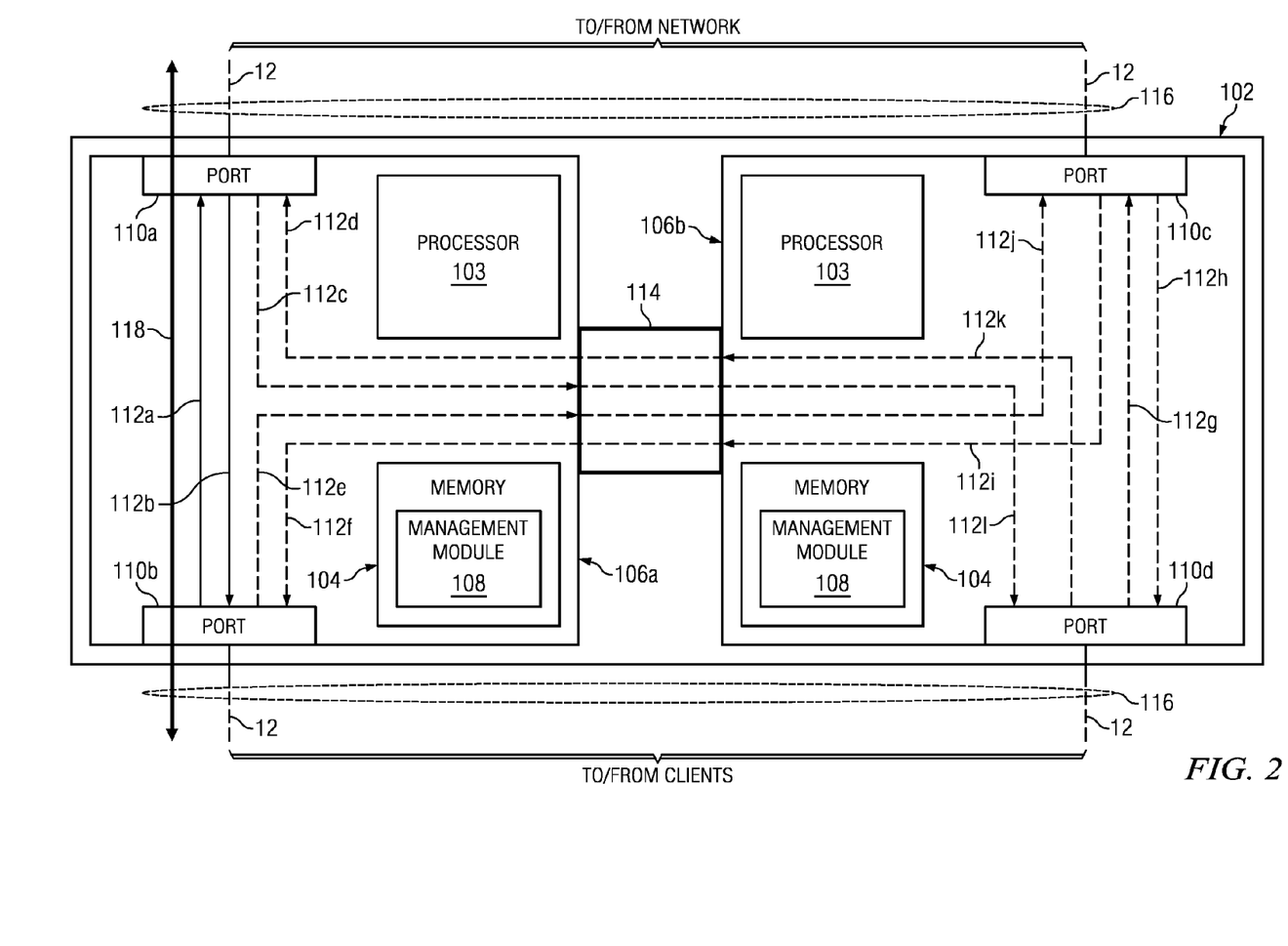
FIG. 2 illustrates a block diagram of an example network element, in accordance with certain embodiments of the present disclosure.
Figure 3:
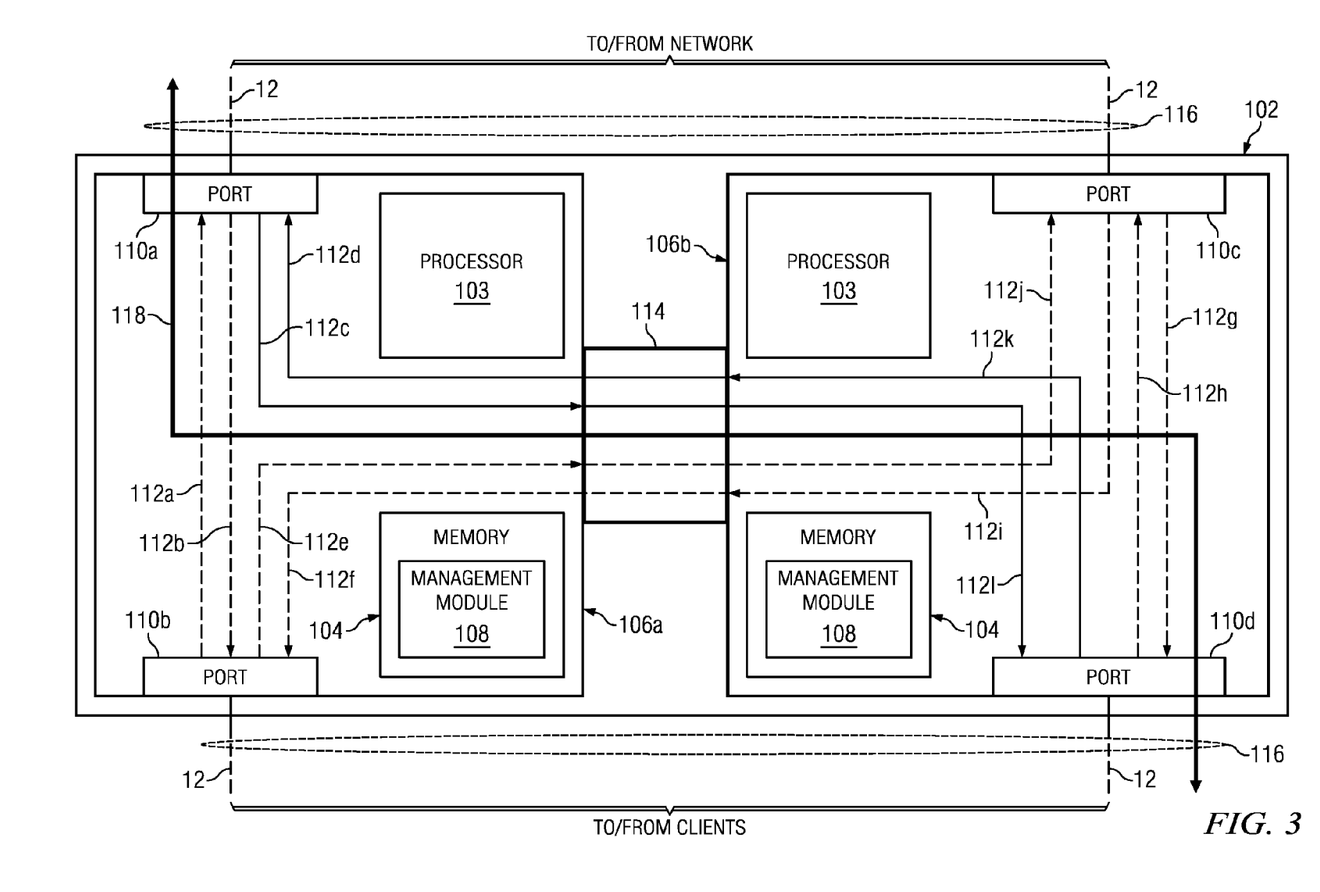
FIG. 3 illustrates a block diagram of the example network element of FIG. 2 after a protection switch, in accordance with certain embodiments of the present disclosure.

FIGS. 2 and 3 illustrate block diagrams an example network element 102, in accordance with certain embodiments of the present disclosure. FIG. 2 illustrates network element 102 after provisioned in accordance with the present disclosure. FIG. 3 illustrates network element 102 after occurrence of a protection switch, in accordance with the present disclosure.

As discussed above, each network element 102 may be coupled to one or more other network elements 102 via one or more transmission media 12. Each network element 102 may generally be configured to receive data from and/or transmit data to one or more other network elements 102. In certain embodiments, network element 102 may comprise a switch configured to route data received by network element 102 to another device (e.g., another network element 102) coupled to network element 102. As depicted in FIGS. 2 and 3, each network element 102 may include a plurality of plug-in units (PIU) 106 and a mate-link 114 including one or more inter-PIU links.

A PIU 106 may include any system, device, or apparatus having plug-in terminals so that some or all electrical connections of the PIU 106 can be made engaging the unit with a suitable socket of network element 102. As shown in FIGS. 2 and 3, a PIU 106 may include a processor 103, a memory 104, and one or more ports 110.

A processor 103 may include any system, device, or apparatus configured to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, a processor 103 may interpret and/or execute program instructions and/or process data stored in its associated memory 104 and/or another component of network element 102.

A memory 104 may be communicatively coupled to its associated processor 103 and may include any system, device, or apparatus configured to retain program instructions and/or data for a period of time (e.g., computer-readable media). A memory 104 may include random access memory (RAM), electrically erasable programmable read-only memory (EEPROM), a PCMCIA card, flash memory, magnetic storage, opto-magnetic storage, or any suitable selection and/or array of volatile or non-volatile memory that may retain data after power to network element 102 is turned off.

As shown in FIGS. 2 and 3, a memory 104 may have embodied thereon a management module 108. A management module 108 may include any system, device, or apparatus configured to provision one or more flows 112 within its associated PIU 106 for communication of traffic between ports 110 of network element 102, as is described in greater detail below. A management module 108 may also be configured to configure statuses of ports 110 and flows 112 of its associated PIU 106 in order to enable path redundancy (e.g., setting ports 110 and/or flows 112 as active or standby). A management module 108 may be embodied in a program of instructions which may be read from a memory 104 and executed by a processor 103.

A port 110 may be communicatively coupled to one or more other ports 110 via flows 112 and may include any suitable system, apparatus, or device configured to serve as an interface between a network element 102 and a transmission medium 12. A port 110 may enable its associated network element 102 to communicate to other network elements 102 using any suitable transmission protocol and/or standard. A port 110 may be implemented using hardware, software, or any combination thereof. For example, a port 110 may comprise an Ethernet port, an optical port, or any other suitable port. As shown in FIGS. 2 and 3, some of ports 110 (e.g., ports 110a, 110c) may be interfaced to clients (e.g., customers) of a network provider while other of ports 110 (e.g., ports 110b, 100d) may be interfaced to the provider network. For purposes of clarity and exposition, reference may be made throughout this disclosure to network-side ports 110 and client-side ports 110. However, any functionality and/or other characteristics described in the specification or claims of this disclosure explicitly ascribed to a network-side port 110 may also be ascribed to a client-side port 110, and vice versa.

In certain embodiments, two or more physical ports 110 of a particular network element 102, their corresponding physical ports 110 of another network element 102, and their corresponding transmission media 12 may be grouped into a protection group 116. A protection group 116 may provide path redundancy in the event of a link failure (e.g., a failure of transmission media 12, a port 110, or another component of a network 10) that prevents communication between two points via a particular port 110 or transmission medium 12 or the protection group. For example, a particular port 110 and associated transmission medium 12 of a protection group 116 may be designated as an active member of the protection group 116 while other ports 110 and transmission media 12 are designated as standby members. In the event of a failure preventing communication via the active port 110 and/or transmission medium 12, a protection switch may occur whereby a standby port 110 and transmission medium 12 of the protection group 116 is re-designated as active. A protection group may be implemented in accordance with any suitable protocol and/or standard. In some embodiments, a protection group may be implemented as a link aggregation group (LAG). A LAG may include any suitable number of member physical ports 110 and may combine its member ports using link aggregation such that the member ports are represented as a single logical port to components of network 10 external to the LAG.

In operation, management module 108 may configure flows 112 from client ports 110b and 110d and network ports 110a and 110c (and vice versa) on PIUs 106 to allow for packet forwarding and switching, including forwarding and switching between PIUs 106. For example, as shown in FIGS. 2 and 3, management module 108 of PIU 106a may provision a plurality of flows 112 including: (i) a first flow 112a from client-side port 110b to network-side port 110a; (ii) a second flow 112b from network-side port 110a to client-side port 110b; (iii) a third flow 112c from network-side port 110a to mate link 114 interfacing with a mate link 114 to client-side port 110d flow 112l; (iv) a fourth flow 112d from mate link 114 to network-side port 110a interfacing with a client-side port 110d to mate link 114 flow 112k; (v) a fifth flow 112e from client-side port 110b to mate link 114 interfacing with a mate link 114 to network-side port 110c flow 112j; and (vi) a sixth flow 112f from mate link 114 to client-side port 110b interfacing with a network-side port 110c to mate link 114 flow 112i. Similarly, management module 108 of PIU 106b may provision a plurality of flows 112 including: (i) a first flow 112g from client-side port 110d to network-side port 110c; (ii) a second flow 112h from network-side port 110c to client-side port 110d; (iii) a third flow 112i from network-side port 110c to mate link 114 interfacing with a mate link 114 to client-side port 110b flow 112f; (iv) a fourth flow 112j from mate link 114 to network-side port 110c interfacing with a client-side port 110a to mate link 114 flow 112e; (v) a fifth flow 112k from client-side port 110d to mate link 114 interfacing with a mate link 114 to network-side port 110a flow 112d; and (vi) a sixth flow 112l from mate link 114 to client-side port 110d interfacing with a network-side port 110a to mate link 114 flow 112c. Accordingly, flows 112 may form multiple redundant unidirectional paths for traffic between client-side ports 110b, 110d and network-side ports 110a, 110c (and vice versa).

A management module 108 may also be configured to, upon ingress of a datagram of traffic, provision a unique identifier (e.g., a virtual local area network tag) for such datagram. Such unique tag may be used by all management modules 108 of a network element 102 to identify the datagram throughout its data path within network element 102. Furthermore, the unique identifier may be used by a management module to classify datagrams for policing, shaping, and forwarding.

After provisioning various flows 112 on its associated PIU 106, management modules 108 may provision a first active path from the network side to the client side of network element 102 comprising one or more flows 112 and provision a second active path from the client side to the network side of network element 102 comprising one or more flows 112. In some instances, an active path may include a single flow 112a, 112b, 112g, or 112h within a single PIU 106. In other instances, an active path may include a pair of flows 112c and 112l, 112d and 112k, 112e and 112j, or 112d and 112i, in which the flows of the active path are on two different PIUs 106. FIG. 2 depicts active paths comprising flows 112a and 112b which form bidirectional traffic path 118 depicted in FIG. 2. FIG. 3 depicts an active path comprising flows 112c and 112l and an active path comprising flows 112d and 112k, which together form bidirectional traffic path 118 depicted in FIG. 3.

During operation, management modules 108 may perform a protection switch to provision active paths different from the then-present active paths. Such protection switch may occur in the event of a failure or other event that may prevent traffic communication to and/or from network element 102 using the then-present active paths (e.g., failure of a port 110 interfacing with a flow 112 of the then-active path, failure of a transmission medium 12 interfacing with a port interfacing with a flow 112 of the then-active path, etc.). For example, if a protection switching event occurred preventing communication via active paths depicted in FIG. 2, management modules 108 may switch the active paths to the active paths depicted in FIG. 3.

Figure 4:
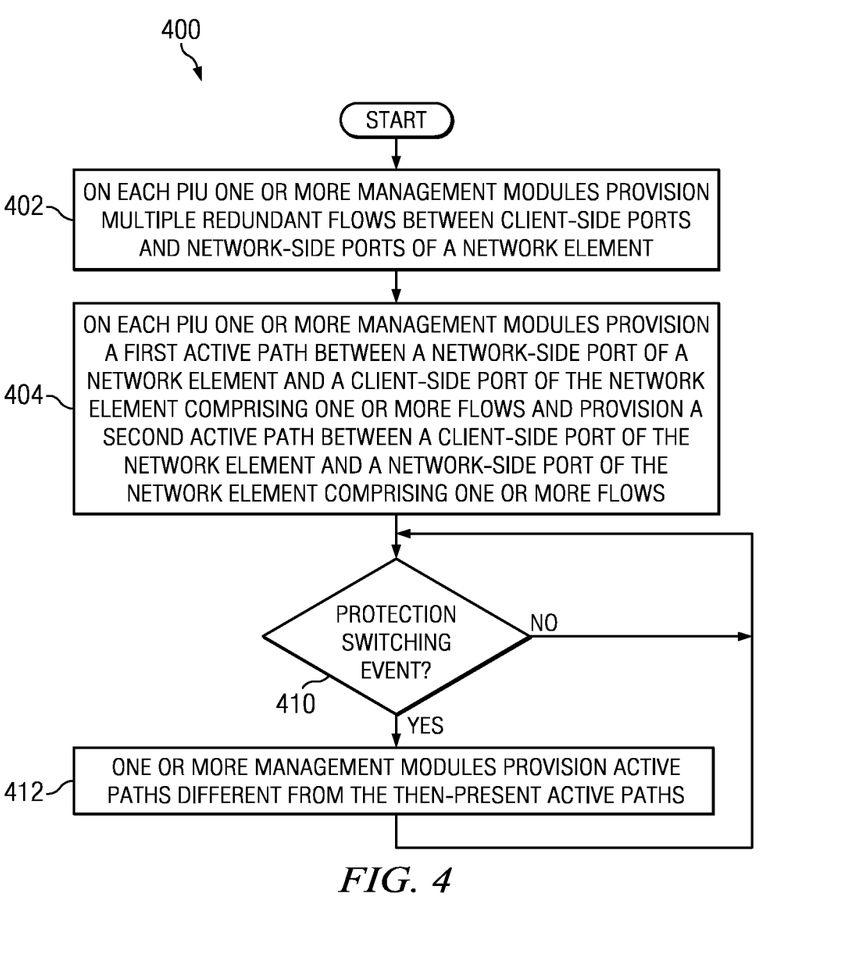
FIG. 4 illustrates a flow chart of an example method for configuration of a network element, in accordance with embodiments of the present disclosure.

FIG. 4 illustrates a flow chart of an example method 400 for configuration of a network element, in accordance with embodiments of the present disclosure. According to some embodiments, method 400 may begin at step 402. As noted above, teachings of the present disclosure may be implemented in a variety of configurations of network 10 and/or network element 102. As such, the preferred initialization point for method 400 and the order of the steps 402-4xx comprising method 400 may depend on the implementation chosen.

At step 402, one or more management modules (e.g., management modules 108) each executing on a PIU (e.g., a PIU 106) may provision multiple redundant flows between client-side ports (e.g., ports 110b and 110d) and network-side ports (e.g., ports 110a and 110c) of a network element. For example, each management module executing on an associated PIU may provision: (i) a first flow from a client-side port of the associated PIU to a network-side port of the associated PIU; (ii) a second flow from the network-side port of the associated PIU to the client-side port of the associated PIU; (iii) a third flow from the network-side port of the associated PIU to a mate link (e.g., a mate link 114) interfacing with a flow from the mate link to a client-side port of a second PIU interfaced to the associated PIU; (iv) a fourth flow from the mate link to the network-side port of the associated PIU interfacing with a flow from the client-side port of the second PIU; (v) a fifth flow from the client-side port of the associated PIU to the mate link 114 interfacing with a flow from the mate link to a network-side port of the second PIU; and (vi) a sixth flow from the mate link to the client-side port of the associated PIU interfacing with a flow from the network-side port of the second PIU to the mate link.

At step 404, one or more management modules may provision a first active path between a network-side port of a network element and a client-side port of the network element comprising one or more flows established in step 402, and may provision a second active path between a client-side port of the network element and a network-side port of the network element comprising one or more flows established in step 402. In some embodiments, the first active flow and the second active flow may both be provisioned between the same network-side port and client-side port.

At step 410, one or more management modules may monitor for a protection switching event preventing communication via the then-present active paths. If a protection switching event is detected, method 400 may proceed to step 412.

Otherwise, method 400 may remain in step 410 until a protection switching event has occurred.

At step 412, in response to a protection switching event, one or more of the management modules may provision active paths different from the then-present active paths. After completion of step 412, method 400 may proceed to step 410.

Although FIG. 4 discloses a particular number of steps to be taken with respect to method 400, method 400 may be executed with greater or lesser steps than those depicted in FIG. 4. In addition, although FIG. 4 discloses a certain order of steps to be taken with respect to method 400, the steps comprising method 400 may be completed in any suitable order.

Method 400 may be implemented using network element 102 or any other system operable to implement method 400. In certain embodiments, method 400 may be implemented partially or fully in software and/or firmware embodied in a memory or other computer-readable media and executable by a processor or other suitable device (e.g., a processor 103).

A component of network 10 may include an interface, logic, memory, and/or other suitable element. An interface receives input, sends output, processes the input and/or output, and/or performs other suitable operation. An interface may comprise hardware and/or software.

Logic performs the operations of the component, for example, executes instructions to generate output from input. Logic may include hardware, software, and/or other logic. Logic may be encoded in one or more tangible computer readable storage media and may perform operations when executed by a computer. Certain logic, such as a processor, may manage the operation of a component. Examples of a processor include one or more computers, one or more microprocessors, one or more applications, and/or other logic.

A memory stores information. A memory may comprise one or more tangible, computer-readable, and/or computer-executable storage medium. Examples of memory include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium.

Modifications, additions, or omissions may be made to network 10 without departing from the scope of the invention. The components of network 10 may be integrated or separated. Moreover, the operations of network 10 may be performed by more, fewer, or other components. Additionally, operations of network 10 may be performed using any suitable logic. As used in this document, "each" refers to each member of a set or each member of a subset of a set.

Certain embodiments of the invention may provide one or more technical advantages. A technical advantage of one embodiment may be that alarm indication signals that typically originate from maintenance end points may be transmitted in the event that equipment upon which the maintenance end points have experienced a fault, thus reducing the occurrence of unnecessary alarms.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

What is claimed is:

1. A network element comprising:
   a first plug-in unit comprising:
      a first client-side port;
      a first network-side port communicatively coupled to the first client-side port;
      a first processor; and
      a first management module embodied in a computer-readable medium and configured to be read and executed by the first processor;
   a second plug-in unit communicatively coupled to the first plug-in unit via a mate link, the second plug-in unit comprising:
      a second client-side port;
      a second network-side port communicatively coupled to the first client-side port;
      a second processor; and
      a second management module embodied in a computer-readable medium and configured to be read and executed by the second processor;
   wherein, the first management module is further configured to, when read and executed by the first processor, provision:
      a first flow from the first client-side port to the first network-side port;
      a second flow from the first network-side port to the first client-side port;
      a third flow from the first network-side port to the mate link, the third flow configured to interface with a fourth flow from the mate link to the second client-side port;
      a fifth flow from the mate link to the first network-side port, the fifth flow configured to interface with a sixth flow from the second client-side port to the mate link;
      a seventh flow from the first client-side port to the mate link, the seventh flow configured to interface with an eighth flow from the mate link to the second network-side port; and
      a ninth flow from the mate link to the first client-side port, the ninth flow configured to interface with a tenth flow from the second network-side port to the mate link; and
   wherein, the second management module is further configured to, when read and executed by the second processor, provision:
      the fourth flow;
      the sixth flow;
      the eighth flow;
      the tenth flow;
      an eleventh flow from the second client-side port to the second network-side port; and
      a twelfth flow from the second network-side port to the second client-side port.

2. A network element according to claim 1, at least one of the first management module and the second management module further configured to, when read and executed by its respective processor:
   provision a first active path originating at one of the first network-side port and the second network-side port and ending at one of the first client-side port and the second client-side port, the first active path comprising: (i) the second flow, (ii) the third flow and the fourth flow, (iii) the ninth flow and the tenth flow, or (iv) the twelfth flow; and
   provision a second active path originating at one of the first client-side port and the second client-side port and ending at one of the first network-side port and the second network-side port, the second active path comprising: (i)

the first flow, (ii) the fifth flow and the sixth flow, (iii) the seventh flow and the eighth flow, or (iv) the eleventh flow.

3. A network element according to claim 2, at least one of the first management module and the second management module further configured to, when read and executed by its respective processor:
monitor for an occurrence of a protection switching event preventing communication to or from the network element via the first active path or the second active path; and
provision active paths different from the first active path and the second active path in response to detection of the protection switching event.

4. A network element according to claim 1:
the first management module further configured to, when read and executed by the first processor, police traffic ingressing on the first plug-in unit; and
the second management module further configured to, when read and executed by the second processor, police traffic ingressing on the second plug-in unit.

5. A network element according to claim 1:
the first management module further configured to, when read and executed by the first processor, shape traffic egressing on the first plug-in unit; and
the second management module further configured to, when read and executed by the second processor, shape traffic egressing on the second plug-in unit.

6. A network element according to claim 1, wherein the first client-side port and the second client-side port are members of a protection group.

7. A network element according to claim 6, wherein the first client-side port and the second client-side port are members of a link aggregation group.

8. A network element according to claim 1, wherein the first network-side port and the second network-side port are members of a protection group.

9. A plug-in unit comprising:
a client-side port;
a network-side port communicatively coupled to the first client-side port;
a processor; and
a management module embodied in a computer-readable medium and configured to, when read and executed by the processor, provision:
a first flow from the client-side port to the network-side port;
a second flow from the network-side port to the client-side port;
a third flow from the network-side port to a mate link configured to communicatively couple the plug-in unit to a second plug-in unit, the third flow configured to interface with a fourth flow from the mate link to a second client-side port of the second plug-in unit;
a fifth flow from the mate link to the network-side port, the fifth flow configured to interface with a sixth flow from the second client-side port to the mate link;
a seventh flow from the client-side port to the mate link, the seventh flow configured to interface with an eighth flow from the mate link to a second network-side port of the second plug-in unit; and
a ninth flow from the mate link to the client-side port, the ninth flow configured to interface with a tenth flow from the second network-side port to the mate link.

10. A plug-in unit according to claim 9, the management module further configured to when read and executed by the first processor:
provision, alone or in concert with a second management module configured to execute on the second plug-in unit, a first active path originating at one of the network-side port and the second network-side port and ending at one of the client-side port and the second client-side port, the first active path comprising: (i) the second flow, (ii) the third flow and the fourth flow, or (iii) the ninth flow and the tenth flow; and
provision, alone or in concert with the second management module, a second active path originating at one of the client-side port and the second client-side port and ending at one of the network-side port and the second network-side port, the second active path comprising: (i) the first flow, (ii) the fifth flow and the sixth flow, or (iii) the seventh flow and the eighth flow.

11. A plug-in according to claim 10, the management module further configured to when read and executed by the first processor:
monitor, alone or in concert with the second management module, for an occurrence of a protection switching event preventing communication via the first active path or the second active path; and
provision, alone or in concert with the second management module, active paths different from the first active path and the second active path in response to detection of the protection switching event.

12. A plug-in unit according to claim 9, the management module further configured to, when read and executed by the processor, police traffic ingressing on the plug-in unit.

13. A plug-in unit according to claim 9, the management module further configured to, when read and executed by the processor, shape traffic egressing on the plug-in unit.

14. A plug-in unit according to claim 9, wherein the client-side port and the second client-side port are members of a protection group.

15. A plug-in unit according to claim 14, wherein the client-side port and the second client-side port are members of a link aggregation group.

16. A plug-in unit according to claim 9, wherein the network-side port and the second network-side port are members of a protection group.

17. A method comprising:
provisioning a first flow from a client-side port of a plug-in unit to a network-side port of the plug-in unit;
provisioning a second flow from the network-side port to the client-side port of the plug-in unit;
provisioning a third flow from the network-side port to a mate link configured to communicatively couple the plug-in unit to a second plug-in unit, the third flow configured to interface with a fourth flow from the mate link to a second client-side port of the second plug-in unit;
provisioning a fifth flow from the mate link to the network-side port, the fifth flow configured to interface with a sixth flow from the second client-side port to the mate link;
provisioning a seventh flow from the client-side port to the mate link, the seventh flow configured to interface with an eighth flow from the mate link to a second network-side port of the second plug-in unit; and
provisioning a ninth flow from the mate link to the client-side port, the ninth flow configured to interface with a tenth flow from the second network-side port to the mate link.

18. A method according to claim 17, further comprising:
provisioning the fourth flow;
provisioning the sixth flow;

provisioning the eighth flow;
provisioning the tenth flow;
provisioning an eleventh flow from the second client-side port to the second network-side port; and
provisioning a twelfth flow from the second network-side port to the second client-side port.

19. A method according to claim 17, further comprising:
provisioning a first active path originating at one of the network-side port and the second network-side port and ending at one of the client-side port and the second client-side port, the first active path comprising: (i) the second flow, (ii) the third flow and the fourth flow, or (iii) the ninth flow and the tenth flow; and
provisioning a second active path originating at one of the client-side port and the second client-side port and ending at one of the network-side port and the second network-side port, the second active path comprising: (i) the first flow, (ii) the fifth flow and the sixth flow, or (iii) the seventh flow and the eighth flow.

20. A method according to claim 19 further comprising:
monitoring for an occurrence of a protection switching event preventing communication via the first active path or the second active path; and
provisioning active paths different from the first active path and the second active path in response to detection of the protection switching event.

* * * * *